United States Patent
Oh et al.

(10) Patent No.: US 11,623,644 B2
(45) Date of Patent: Apr. 11, 2023

(54) APPARATUS AND METHOD FOR CONTROLLING VEHICLE BASED ON CUT-IN PREDICTION IN JUNCTION SECTION

(71) Applicants: HYUNDAI MOTOR COMPANY, Seoul (KR); KIA MOTORS CORPORATION, Seoul (KR)

(72) Inventors: Young Chul Oh, Seongnam-si (KR); Dong Hoon Kang, Suwon-si (KR); Hoon Kyung Cho, Seoul (KR); Seok Youl Yang, Incheon (KR); Jae Hwan Jang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 175 days.

(21) Appl. No.: 16/512,694

(22) Filed: Jul. 16, 2019

(65) Prior Publication Data
US 2020/0180637 A1     Jun. 11, 2020

(30) Foreign Application Priority Data
Dec. 7, 2018    (KR) .......................... 10-2018-0157443

(51) Int. Cl.
*B60W 30/18*     (2012.01)
*B60W 30/095*    (2012.01)
*G08G 1/16*      (2006.01)
*G08G 1/01*      (2006.01)
*G05D 1/02*      (2020.01)

(52) U.S. Cl.
CPC .. B60W 30/18163 (2013.01); B60W 30/0956 (2013.01); G08G 1/0125 (2013.01); G08G 1/167 (2013.01); *G05D 1/02* (2013.01)

(58) Field of Classification Search
CPC .................... B60W 30/0956; B60W 30/18163
See application file for complete search history.

(56) References Cited

U.S. PATENT DOCUMENTS

2019/0329778 A1* 10/2019 D'sa ..................... B62D 15/025
2019/0329779 A1* 10/2019 D'sa ..................... G06N 20/20
2019/0367034 A1* 12/2019 Okajima ............... B60W 50/14
2020/0094830 A1*  3/2020 Ito ....................... B60W 30/165

* cited by examiner

*Primary Examiner* — Jess Whittington
(74) *Attorney, Agent, or Firm* — Lempia Summerfield Katz LLC (57) ABSTRACT

A vehicle running control method includes: when a junction section lane is present adjacent to a traveling lane of a host vehicle, collecting, by a processor, vehicle information of at least one vehicle traveling in the junction section lane; determining, by the processor, the possibility of cut-in of junction section lane vehicles based on the collected vehicle information and whether the traveling lane is congested; and controlling, by the processor, at least one of the traveling path or the traveling velocity of the host vehicle based on the result of determination in order to display an intention to yield.

8 Claims, 7 Drawing Sheets

APPARATUS AND METHOD FOR CONTROLLING VEHICLE BASED ON CUT-IN PREDICTION IN JUNCTION SECTION

CROSS-REFERENCE TO RELATED APPLICATION

This application claims priority to and the benefit of Korean Patent Application No. 10-2018-0157443, filed on Dec. 7, 2018, the entire contents of which are incorporated herein by reference.

FIELD

The present disclosure relates to an apparatus and method for controlling the running of an autonomous vehicle.

BACKGROUND

The statements in this section merely provide background information related to the present disclosure and may not constitute prior art.

Conventional lane changing technology is merely configured such that, when a driver shows his/her intention to change lanes (for example, when the driver turns on a turn signal lamp), it is determined whether it is possible to change lanes within a predetermined time, and the lane change is performed upon determining that it is possible to change lanes.

Additionally, in most research on autonomous traveling, the lane change is performed only when it is possible to change lanes, for example, when a route that makes it possible to avoid a collision is generated. Furthermore, level-4 autonomous traveling must be designed such that traveling is possible from the current position to a destination without the intervention of a driver under limited operational design domain (ODD) conditions, unlike level-2 autonomous traveling (ADAS system). Therefore, the conventional lane-changing technology has difficulty satisfying the requirements of the level-4 autonomous traveling.

In particular, a conventional autonomous vehicle generally takes a strategy of securing a safe distance from an adjacent vehicle when predicting cut-in of the adjacent vehicle while maintaining a predetermined distance from a preceding vehicle. On a junction road, in which adjacent vehicles must change lanes, therefore, we have found that it is difficult to identify a vehicle having the intention to yield through a general cut-in prediction. In addition, such determination tends to be slower than recognition by people, whereby a user may feel discomfort.

Therefore, we have discovered that it is desired to establish a traveling strategy capable of predicting a cut-in vehicle and controlling the traveling path or the traveling velocity of an autonomous vehicle in the case in which a junction section lane is present adjacent to a traveling lane, thereby securing stability in the relationship with other vehicles.

SUMMARY

The present disclosure provides a vehicle running control apparatus and method that are capable of, when a traveling lane is congested, recognizing a preceding vehicle that cuts in ahead of a front vehicle, which is located in front of a host vehicle, in order to detect a yielding target vehicle in advance and maintaining a short distance from the yielding target vehicle in order to inhibit or prevent the entry of other vehicles into the traveling lane, thereby securing stability in the relationship with other vehicles.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the present disclosure, as embodied and broadly described herein, a vehicle running control method includes: when a junction section lane is present adjacent to a traveling lane of a host vehicle, collecting, by one or more processors, vehicle information of at least one junction section lane vehicle among a plurality of junction section lane vehicles that are traveling in the junction section lane; determining, by the one or more processors, the possibility of cut-in of the at least one junction section lane vehicle based on the collected vehicle information and whether the traveling lane is congested; and controlling, by the one or more processors, at least one of the traveling path or the traveling velocity of the host vehicle based on the determined possibility of cut-in so as to display an intention to yield.

The step of collecting the vehicle information may include collecting the position, the velocity, and the acceleration of each of the plurality of junction section lane vehicles through a sensor.

Whether the traveling lane is congested may be determined by comparing a first velocity flow, which corresponds to the average velocity of a front vehicle traveling in the traveling lane, with a critical value.

The step of determining the possibility of cut-in may include: estimating a cut-in point of a preceding vehicle that cuts in ahead of the front vehicle, among the plurality of junction section lane vehicles, when the first velocity flow is less than the critical value; and determining a vehicle adjacent to the estimated cut-in point, among vehicles behind the preceding vehicle, as a yielding target vehicle.

The step of determining the possibility of cut-in may be performed according to a predetermined trigger signal, and the predetermined trigger signal may be generated when a second velocity flow, which is calculated by applying a predetermined weight to the average velocity of the plurality of junction section lane vehicles, is less than a critical value.

The step of displaying the intention to yield may include detecting lateral behavior of the yielding target vehicle through a sensor, generating a path following the front vehicle while maintaining a predetermined distance from the yielding target vehicle when no lateral behavior of the yielding target vehicle is detected, and reducing the traveling velocity in order to maintain a predetermined safe distance from the yielding target vehicle in the case in which the lateral behavior of the yielding target vehicle is detected.

The step of determining the possibility of cut-in may include selecting vehicles having a lower traveling velocity than a velocity of the host vehicle, among the plurality of junction section lane vehicles, as a yielding target vehicle candidate group when the first velocity flow is equal to or greater than the critical value.

The step of displaying the intention to yield may include: calculating a deceleration based on the time to be taken for the host vehicle to collide with a vehicle in the yielding target vehicle candidate group, and when the calculated deceleration is equal to or greater than a predetermined first value and less than a predetermined second value, controlling the velocity of the host vehicle with the calculated deceleration.

The step of displaying the intention to yield may include controlling the traveling path of the host vehicle such that the host vehicle travels while deviating in the direction opposite to the junction section lane when the calculated deceleration is equal to or greater than the predetermined second value.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Since the forms of the present disclosure may be variously modified and may have various forms, specific forms will be shown in the drawings and will be described in detail in this specification or this disclosure. However, the forms according to the concept of the present disclosure are not limited by such specific forms, and it should be understood that the present disclosure includes all alterations, equivalents, and substitutes that fall within the idea and technical scope of the present disclosure.

It will be understood that, although the terms "first", "second", etc. may be used herein to describe various elements, the corresponding elements should not be understood to be limited by these terms, which are used only to distinguish one element from another. In addition, the terms particularly defined in consideration of the constructions and operations of the exemplary forms are provided to explain the forms, rather than to limit the scope of the present disclosure.

The terms used in this specification are provided only to explain specific forms, but are not intended to restrict the present disclosure. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meaning as commonly understood by a person having ordinary skill in the art to which the present disclosure pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Hereinafter, a vehicle running control apparatus according to the present disclosure will be described with reference to the accompanying drawings. First of all, the principal terms used in this specification and the drawings will be described as follows:

Host vehicle: Subject vehicle,

Adjacent vehicles: Vehicles other than the host vehicle that are detected by a sensor unit mounted in the host vehicle, Preceding vehicle: Adjacent vehicle that travels ahead of the host vehicle, Traveling lane: Lane in which the host vehicle is traveling, Junction section lane: Lane having a junction section from which the lane is terminated ahead, and Junction section lane vehicles: Adjacent vehicles that are traveling in the junction section lane.

Figure 1:
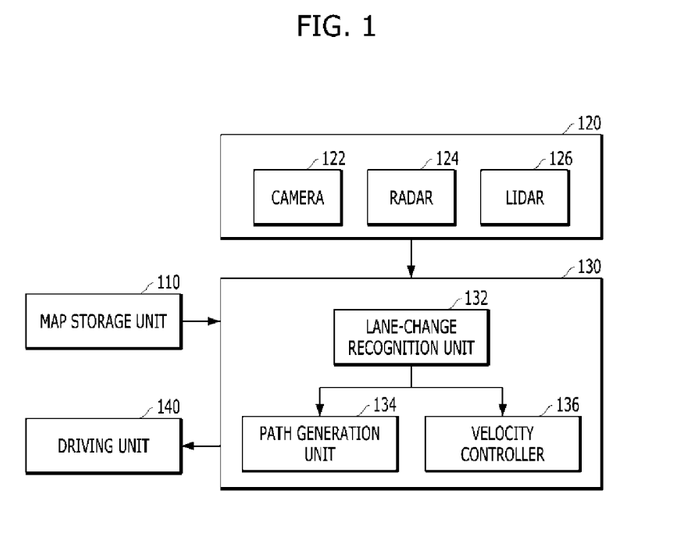
FIG. 1 is a schematic block diagram showing an autonomous vehicle.

FIG. 1 is a schematic block diagram showing an autonomous vehicle according to one form of the present disclosure As shown in FIG. 1, the autonomous vehicle, denoted by reference numeral 100, may include: a map storage unit 110, a sensor unit 120, a vehicle running control apparatus 130, a turn signal lamp 140, and a driving unit 150.

Also, the terms, such as 'unit' or 'module', 'controller', etc., should be understood as a unit that processes at least one function or operation and that may be embodied in a hardware manner (e.g., a processor), a software manner, or a combination of the hardware manner and the software manner.

The map storage unit 110 may store information about a high-definition map, from which it is possible to distinguish between vehicle lanes, in the form of a database (DB). The high-definition map may be automatically and periodically updated through wireless communication, or may be manually updated by a user, and may include lane-based junction section information (including, for example, information about a lane having a junction section from which the lane is interrupted ahead), position-based road information, road divergence information, and intersection information.

The map storage unit 110 may be implemented as at least one of flash memory, a hard disk, a secure digital (SD) card, random access memory (RAM), read only memory (ROM), or web storage.

The sensor unit 120 may acquire information about vehicles around a host vehicle, and may recognize one or more adjacent vehicles located within a detection range RF.

The sensor unit 120 may sense one or more adjacent vehicles located ahead of, beside, and behind the host vehicle, and may detect the position, the velocity, and the acceleration of each of the adjacent vehicles.

The sensor unit 120 may include a camera 122, a radar 124, and a LiDAR 126, which are mounted to the front, the side, and the rear of the host vehicle.

The camera 122 may acquire images of the surroundings of the host vehicle through an image sensor. The camera may include an image processor for performing image processing, such as noise removal, quality and saturation adjustment, and file compression, with respect to the acquired images.

The radar 124 may measure the distance between the host vehicle and adjacent vehicles. The radar 124 may emit electromagnetic waves to the adjacent vehicles and may receive the electromagnetic waves reflected by the adjacent vehicles in order to determine the distance to each of the adjacent vehicles, the direction of each of the adjacent vehicles, and the altitude of each of the adjacent vehicles.

The LiDAR 126 may measure the distance between the host vehicle and the adjacent vehicles. The LiDAR 126 may emit laser pulses to the adjacent vehicles and may measure the arrival time of each of the laser pulses reflected by the adjacent vehicles to calculate the spatial positional coordinates of the reflection points, thereby determining the distance to each of the adjacent vehicles and the shape of each of the adjacent vehicles.

The vehicle running control apparatus 130 may receive the lane-based junction section information, included in the high-definition map, from the map storage unit 110, and may determine whether a junction section is present adjacent to a traveling lane (for example, in the lane next to the traveling lane).

The vehicle running control apparatus 130 may receive vehicle information of one or more adjacent vehicles located within the detection range FR from the sensor unit 120. Here, the vehicle information may include the position, the velocity, and the acceleration of each of the adjacent vehicles. The vehicle running control apparatus 130 may determine whether the traveling lane and a junction section lane are congested based on the vehicle information of the adjacent vehicles received from the sensor unit 120.

The vehicle running control apparatus 130 may determine the possibility of cut-in of junction section lane vehicles based on the vehicle information received from the sensor unit 120 and the determination as to whether the traveling lane is congested, and may control at least one of the traveling path or the traveling velocity of the host vehicle according to the result of the determination in order to display the intention to yield.

In addition, the vehicle running control apparatus 130 may determine a degree of danger of a collision based on the behavior of the junction section lane vehicles, and may generate a path following the front vehicle and/or a deviation traveling path, in which the host vehicle deviates in the direction opposite the junction section lane, according to the result of the determination of the degree of danger of the collision, or may reduce the traveling velocity of the host vehicle in order to secure the minimum safe distance.

The vehicle running control apparatus 130 may include a lane-change recognition unit 132, a path generation unit 134, and a velocity controller 136.

The lane-change recognition unit 132 may determine whether a junction section lane is present adjacent to the traveling lane of the host vehicle based on the lane-based junction section information received from the map storage unit 110.

Upon determining that the lane next to the traveling lane is a junction section lane, the lane-change recognition unit 132 may determine whether the traveling lane and/or the junction section lane are congested based on the vehicle information of the adjacent vehicles, received from the sensor unit 120, and may determine the possibility of cut-in of junction section lane vehicles.

In order to determine whether the traveling lane and/or the junction section lane are congested, the lane-change recognition unit 132 may calculate a first velocity flow in the traveling lane and a second velocity flow in the junction section lane, and may determine whether at least one of the first velocity flow or the second velocity flow is less than a predetermined critical value.

Here, the first velocity flow may mean the average velocity of one or more vehicles located ahead of the host vehicle among vehicles traveling in the traveling lane. The first velocity flow $v_a$ may be calculated using Equation 1.

$$v_a = \frac{1}{k}\sum_{k=1}^{n} V_k \qquad \text{[Equation 1]}$$

Here, $v_i$ is the velocity of a k-th vehicle ahead of the host vehicle $V_{ego}$, among vehicles traveling in the traveling lane, $w_i$ is a weight, which is a value arbitrarily defined by a developer (or a user), and n is the number of detected vehicles traveling in the traveling lane.

At this time, the host vehicle may sense information about the velocity of a front vehicle traveling in the traveling lane through the sensor unit 120 and/or may receive information about the velocity of the front vehicle from a communication unit (not shown) outside the vehicle through inter-vehicle communication (V2X; Vehicle to Everything).

The second velocity flow may mean the average velocity of one or more vehicles located within the detection range FR of the sensor unit 120, among vehicles traveling in the junction section lane. For the second velocity flow, a predetermined weight may be applied to the average velocity in order to reduce or minimize errors due to inaccurate measurement of the sensor unit 120 or noise. The second velocity flow will be described in detail with reference to FIG. 2.

Figure 2:
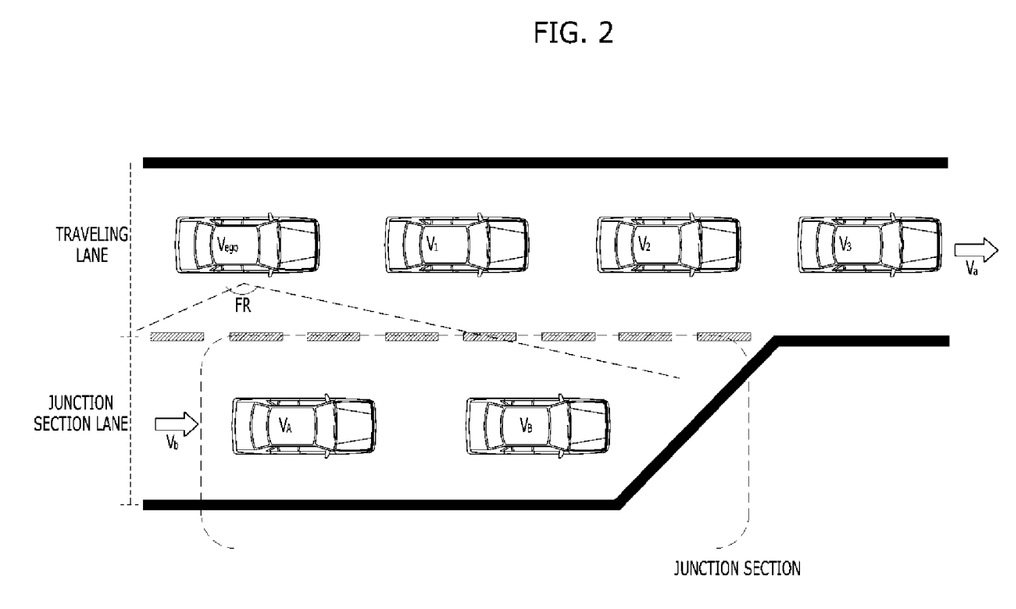
FIG. 2 is a view illustrating velocity flow in a junction section lane.

FIG. 2 is a view illustrating a velocity flow in a junction section lane related to the present disclosure. Hereinafter, a second velocity flow $v_b$ in the junction section lane will be described for the convenience of description. Depending on the circumstances, however, the first velocity flow $v_a$ in the traveling lane may also be calculated in the same manner.

As shown in FIG. 2, when vehicles $V_A$ and $V_B$ in a junction section lane, which is the lane located at the right side of the traveling lane (in the direction in which the vehicles advances), attempts a lane change to the traveling lane, the second velocity flow $v_b$ in the junction section lane may be calculated using Equation 2.

$$v_b = v_m + \sum_{i=1}^{n}(v_i - v_m)w_i, \left(v_m = \frac{1}{n}\sum_{i=1}^{n} v_i\right) \qquad \text{[Equation 2]}$$

Here, $v_m$ is the average velocity of one or more vehicles $V_A$ and $V_B$ located within the detection range FR of the sensor unit 120, among vehicles traveling in the junction section lane, $v_i$ is the velocity of an i-th junction section lane vehicle, $w_i$ is a weight, which is a value arbitrarily defined by a developer (or a user), and n is the number of detected junction section lane vehicles.

The weight $w_i$, which is applied to the respective junction section lane vehicles $V_A$ and $V_B$, may include a value in which variation in the average velocity $v_m$ is reflected, and may be preset using a Gaussian function.

Meanwhile, in the case in which the host vehicle receives information about the velocity of each of the vehicles located ahead of the host vehicle through inter-vehicle communication (V2X), the first velocity flow $v_a$ in the traveling lane may also be applied in the same manner as in the method of calculating the second velocity flow $v_b$ to which the predetermined weight is applied.

Referring back to FIG. 1, in the case in which the calculated first velocity flow is less than the predetermined critical value, the lane-change recognition unit 132 may estimate a cut-in point of a vehicle that cuts in ahead of the vehicle in front of the host vehicle in order to determine the possibility of cut-in of the junction section lane vehicles. At this time, the possibility of cut-in of the junction section lane vehicles may be determined according to a predetermined trigger signal, which may be generated when the second velocity flow is less than the predetermined critical value.

In the case in which the calculated first velocity flow is equal to or greater than the predetermined critical value, the lane-change recognition unit 132 may select vehicles having a lower traveling velocity than the host vehicle, among the junction section lane vehicles, as a yielding target vehicle candidate group in order to determine whether there is the possibility of cut-in of the junction section lane vehicles.

Here, the predetermined critical value is a reference value based on which it is determined whether the traveling lane and the junction section lane are congested, and may have a range of about 20 kph to 30 kph. However, the critical value may differ depending on the road (for example, whether the road is an expressway or a general public road), and does not need to be limited to the above range.

As previously described, the lane-change recognition unit 132 may determine whether there is the possibility of cut-in of the junction section lane vehicles individually in the case in which the first velocity flow in the traveling lane is less than the predetermined critical value and in the case in which the first velocity flow in the traveling lane is equal to or greater than the predetermined critical value. The reason for this is as follows.

In the case in which both the traveling lane and the junction section lane are congested, a traveling strategy may be established such that the traveling lane vehicles and the junction section lane vehicles alternately enter the traveling lane in consideration of the flow of traffic. In the case in which traffic in the traveling lane is relatively smooth, however, this traveling strategy may hinder the flow of adjacent vehicles and may cause traffic congestion. Therefore, yielding strategies suitable for respective traveling lane situations are desired.

A vehicle running control apparatus 130 according to one form of the present disclosure may perform control such that the host vehicle has different traveling paths or traveling velocities in the case in which the traveling lane is congested and in the case in which traffic in the traveling lane is smooth. This will be described hereinafter with reference to FIGS. 3A-3C and 4.

Figure 3A:
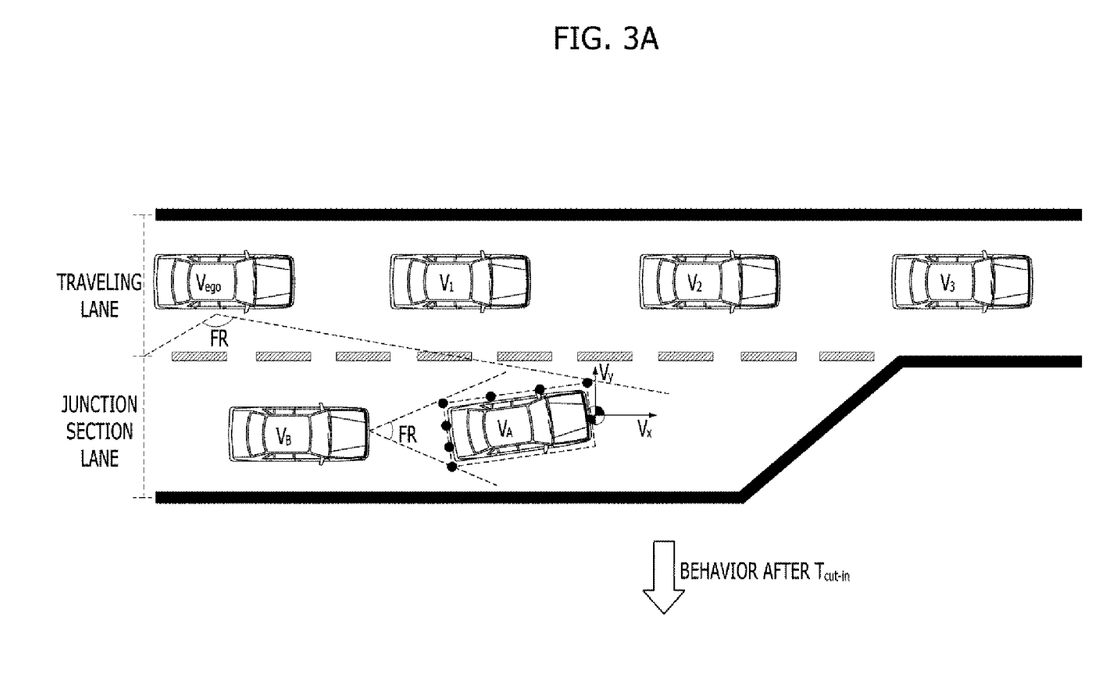
FIGS. 3A, 3B and 3C are views illustrating a method by which a vehicle running control apparatus controls a traveling path or a traveling velocity in the case in which both a traveling lane and a junction section lane are congested.
Figure 3B:
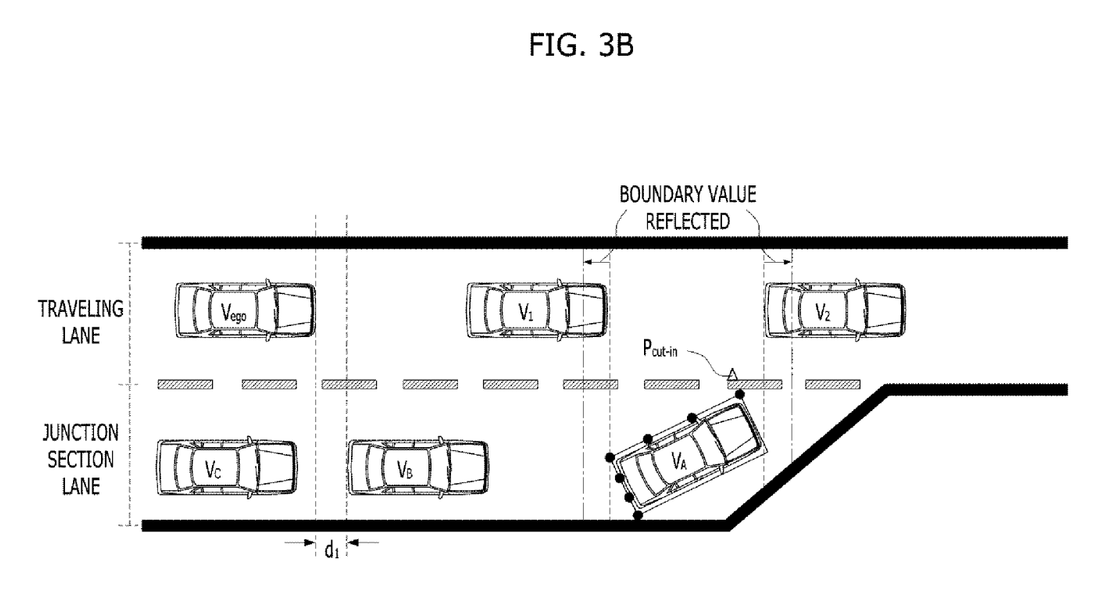
Figure 3C:
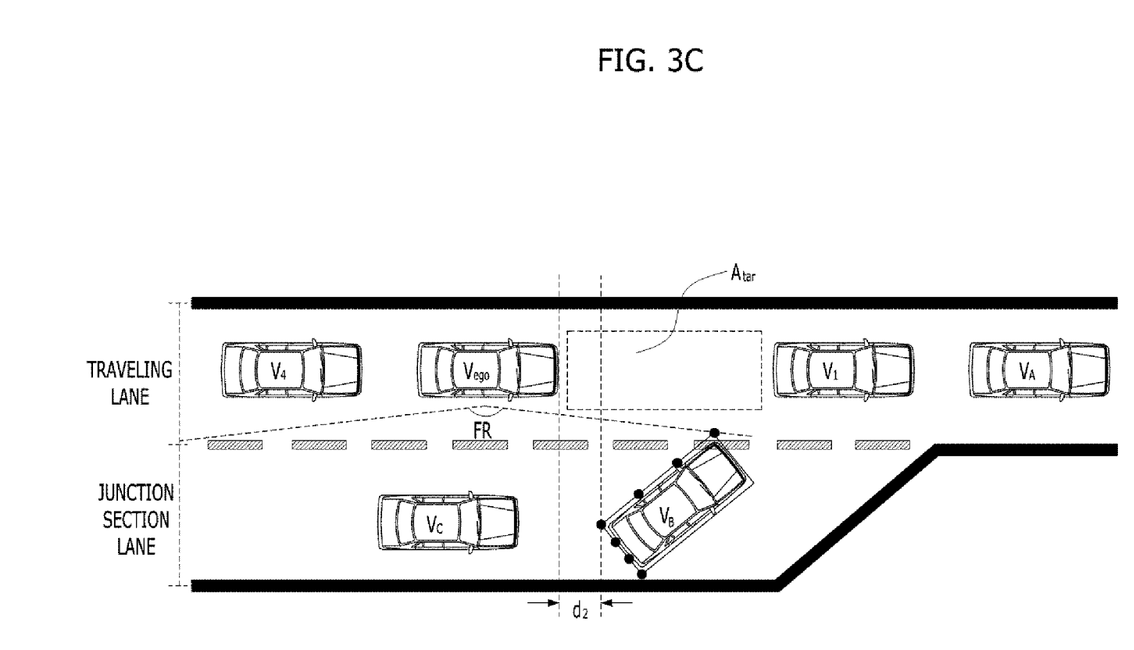

FIGS. 3A-3C are views illustrating a method by which the vehicle running control apparatus 130 controls a traveling path or a traveling velocity in the case in which both the traveling lane and the junction section lane are congested according to one form of the present disclosure.

Referring to FIGS. 3A-3C, in the case in which each of the first and second velocity flows $v_a$ and $v_b$ is less than the critical value, the lane-change recognition unit 132 may estimate a cut-in point of the preceding vehicle $V_A$, which cuts in ahead of the front vehicle $V_1$ traveling in the traveling lane, among the junction section lane vehicles $V_A$ and $V_B$, and may determine the vehicle corresponding to the estimated cut-in point $P_{cut-in}$ to be a yielding target vehicle.

As shown in FIG. 3A, the lane-change recognition unit 132 may estimate a position $P_{cut-in}$, calculated based on the time $t_{cut-in}$ desired for the preceding vehicle $V_A$ to enter the traveling lane and the lateral velocity $v_y$ and the longitudinal velocity $v_x$ of the preceding vehicle $V_A$ in the direction in which the preceding vehicle $V_A$ is advancing, as a cut-in point of the preceding vehicle $V_A$.

At this time, the lane-change recognition unit 132 may perform modeling based on the image of the preceding vehicle $V_A$ acquired through the sensor unit 120, may extract a plurality of feature points, and may calculate the lateral velocity $v_y$ of the preceding vehicle $V_A$ using the movement value of the leftmost point corresponding to the heading direction of the preceding vehicle $V_A$.

In addition, referring to FIG. 3B, the cut-in point may be estimated by reflecting a predetermined boundary value, set in consideration of accuracy in the measurement of the sensor unit 120, the overall length of the preceding vehicle $V_A$, or the driving tendency of a driver (for example, the aggressive driving tendency of the driver), in the calculated position $P_{cut-in}$. Here, the predetermined boundary value may be preset as a margin defined by a developer.

The lane-change recognition unit 132 may determine a vehicle $V_B$ adjacent to the estimated cut-in point $P_{cut-in}$, among vehicles behind the preceding vehicle, to be a yielding target vehicle $V_B$ based on the position information of the junction section lane vehicles acquired from the sensor unit 120.

Upon receiving information about the yielding target vehicle $v_B$ from the lane-change recognition unit 132, the path generation unit 134 and/or the velocity controller 136 may control the sensor unit 120 in order to detect the lateral behavior of the yielding target vehicle $v_B$. Here, the lateral behavior means the intention of the yielding target vehicle $v_B$ to change lanes, and may be determined using at least one of the heading direction, the change in the lateral position, or the lateral velocity of the yielding target vehicle $v_B$.

In the case in which no lateral behavior of the yielding target vehicle $V_B$ is detected, the path generation unit 134 may generate a path following the front vehicle $V_1$ while maintaining a predetermined first distance from the yielding target vehicle $V_B$. Here, the predetermined first distance $d_1$ is a distance that is preset in order to prevent entry into the lane by a rear approaching vehicle $V_c$ behind the yielding target vehicle $V_B$, and may be set so as to be smaller than the overall length of the rear approaching vehicle $V_C$.

When the traveling lane is congested, as described above, the path generation unit 134 may recognize the preceding vehicle $V_A$ that cuts in ahead of the front vehicle $V_1$, which is located in front of the host vehicle $V_{ego}$, in order to detect the yielding target vehicle $V_B$ in advance, and may maintain a short distance from the yielding target vehicle $V_B$ in order to prevent the entry of other vehicles into the traveling lane. Consequently, it is possible to secure stability in the relationship with other vehicles.

Meanwhile, referring to FIG. 3C, in the case in which the lateral behavior of the yielding target vehicle $V_B$ is detected, the velocity controller 136 may generate a deceleration control signal in order to maintain a predetermined second distance $d_2$ from the yielding target vehicle $V_B$. Here, the predetermined second distance $d_2$ means the minimum safe distance desired to secure an available cut-in space $A_{tar}$ of the yielding target vehicle $V_B$.

In the case in which both the traveling lane and the junction section lane are congested, as described above, the traveling of the host vehicle $V_{ego}$ may be controlled such that the traveling lane vehicles $V_1$, $V_2$, and $V_3$ and the junction section lane vehicles $V_A$, $V_B$, and $V_C$ alternately enter the traveling lane, whereby it is possible to secure the riding comfort of a user or traveling stability in the relationship with other vehicles.

Meanwhile, in the case in which traffic in the traveling lane is relatively smooth, a traveling strategy other than the above-described traveling strategy of the host vehicle $V_{ego}$ is desired. The reason for this is that, in the case in which the traveling lane vehicles $V_1$, $V_2$, and $V_3$ and the junction section lane vehicles $V_A$, $V_B$, and $V_C$ alternately enter the traveling lane, the traveling of rear vehicles may be hindered due to abrupt braking, whereby traffic congestion may occur. Hereinafter, the traveling strategy of the host vehicle $V_{ego}$ in a situation different from the situation shown in FIGS. 3A-3C will be described with reference to FIG. 4.

Figure 4:
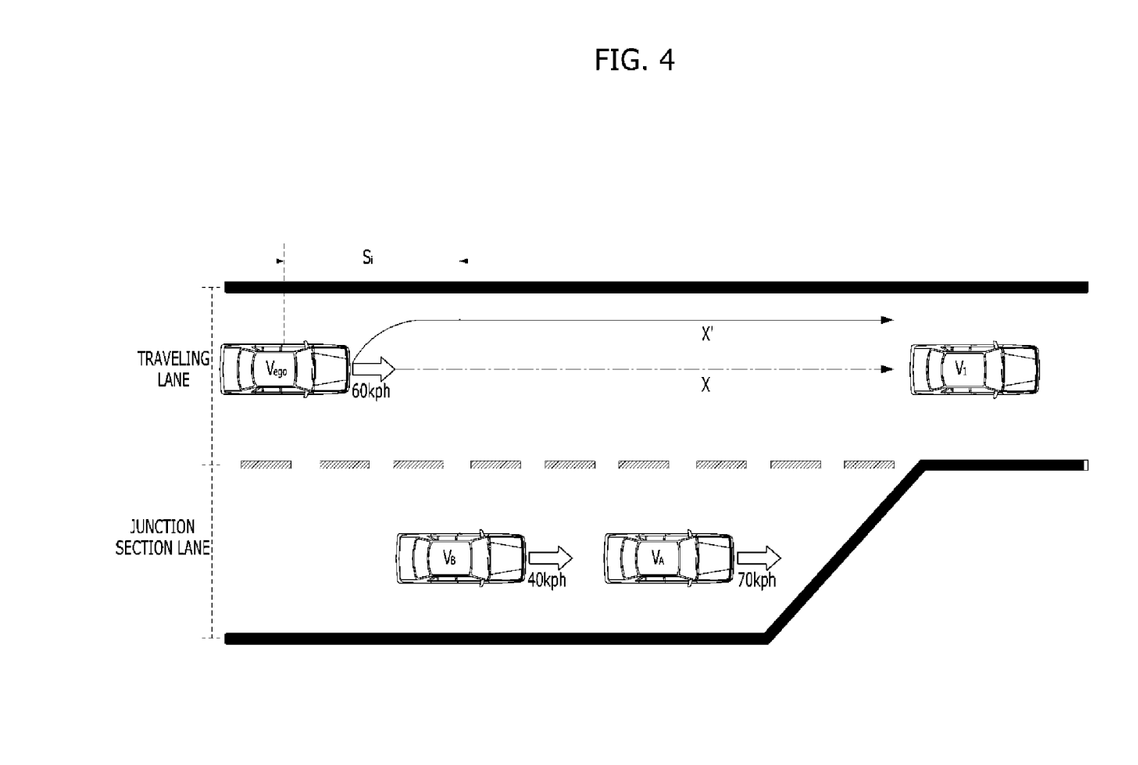
FIG. 4 is a view illustrating a method by which the vehicle running control apparatus controls a traveling path or a traveling velocity in the case in which traffic in a traveling lane is smooth.

FIG. 4 is a view illustrating a method by which the vehicle running control apparatus 300 controls a traveling path or a traveling velocity in the case in which traffic in the traveling lane is smooth according to another form of the present disclosure.

Referring to FIG. 4, in the case in which the first velocity flow $v_a$ is equal to or greater than the critical value, the lane-change recognition unit 132 may select vehicles having a lower traveling velocity than the host vehicle $V_{ego}$, among the junction section lane vehicles $V_A$ and $V_B$, as a yielding target vehicle candidate group $V_B$.

The velocity controller 136 may receive information about at least one yielding target vehicle candidate group $V_B$ from the lane-change recognition unit 132, and may control the velocity of the host vehicle $V_{ego}$ using deceleration $a_i$ calculated based on the time TTC (time to collision) to be taken for the host vehicle $V_{ego}$ to collide with the at least one yielding target vehicle candidate group $V_B$. Here, the time to collision TTC means the time to be taken for the host vehicle $V_{ego}$ to collide with the at least one yielding target vehicle candidate group $V_B$ and $V_C$ in consideration of the relative position, the relative velocity, and the relative acceleration of the at least one yielding target vehicle candidate group $V_B$ and $V_C$ in the case in which the current state is maintained.

The deceleration $a_i$ means uniform deceleration desired for the host vehicle $V_{ego}$ to converge to the traveling velocity of the least one yielding target vehicle candidate group $V_B$ and $V_C$ by considering a predetermined margin time $t_{mar}$ with respect to the time to collision $t_{TTC}$ (for example, by subtracting the margin time $t_{mar}$ from the time to collision $t_{TTC}$) and may calculated using Equation 3. Here, the margin time $t_{mar}$ may be a time preset by a developer in consideration of the danger of a collision.

$$a_i = \frac{v_{tar\_i} - v_{ego}}{t_{TTC} - t_{mar}}, \left( t_{TTC} = \frac{s_i}{v_{ego} - v_{tar\_i}} \right) \quad \text{[Equation 3]}$$

Here, $v_{tar\_i}$ is the velocity of an i-th yielding target vehicle, among at least one candidate group, $v_{ego}$ is the velocity of the host vehicle, $s_i$ is the distance between the i-th yielding target vehicle and the host vehicle, and the relationship $v_{tar\_i} < v_{ego}$ is satisfied.

In the case in which the calculated deceleration $a_i$ is equal to or greater than a predetermined first value and less than a predetermined second value, the velocity controller 136 may control the velocity of the host vehicle $V_{ego}$ so as to perform the calculated deceleration $a_i$.

The predetermined first value is the maximum deceleration desired to yield to the cut-in of at least one yielding target vehicle candidate group $V_B$ in consideration of the riding comfort of the user, and the predetermined second value is the minimum deceleration desired to avoid a collision of the host vehicle $V_{ego}$ with a rear vehicle $V_4$ behind the host vehicle.

In the case in which the deceleration $a_i$ of the host vehicle $V_{ego}$, calculated by the velocity controller 136, is equal to or greater than the predetermined second value, the path generation unit 134 may control the traveling path of the host vehicle $V_{ego}$ such that the host vehicle $V_{ego}$ travels while deviating in the direction X' opposite the junction section lane (for example, toward the left side in the direction in which vehicles advance).

Alternatively, the path generation unit 134 may generate a deviation traveling path even in the case in which the second velocity flow $v_b$ in the junction section lane is less than the predetermined critical value.

The reason for this is that, if the deceleration desired to yield to the cut-in of at least one yielding target vehicle candidate group $V_B$ is greater than the predetermined second value, the host vehicle $V_{ego}$ inevitably collides with the rear vehicle $V_4$ due to abrupt braking. Therefore, a traveling path that deviates in the direction X' opposite the junction section lane may be generated from the current traveling path X in order to protect the user from abrupt cut-in of the junction section lane vehicle $V_B$.

Meanwhile, the driving unit 140 is configured to drive the host vehicle $V_{ego}$ in response to a control signal from the path generation unit 134 and/or the velocity controller 136, and may include components for actually driving the vehicle, such as a brake, an accelerator, a transmission, and a steering device.

For example, in the case in which the control signal from the path generation unit 134 and/or the velocity controller 136 is a signal indicating deviation traveling in the direction X' opposite the junction section lane, the brake of the driving unit 140 may perform a deceleration operation, and the steering device may apply torque in the leftward direction.

Hereinafter, a vehicle running control method for responding to a vehicle that changes lanes from the junction section lane to the traveling lane will be described with reference to FIG. 5.

Figure 5:
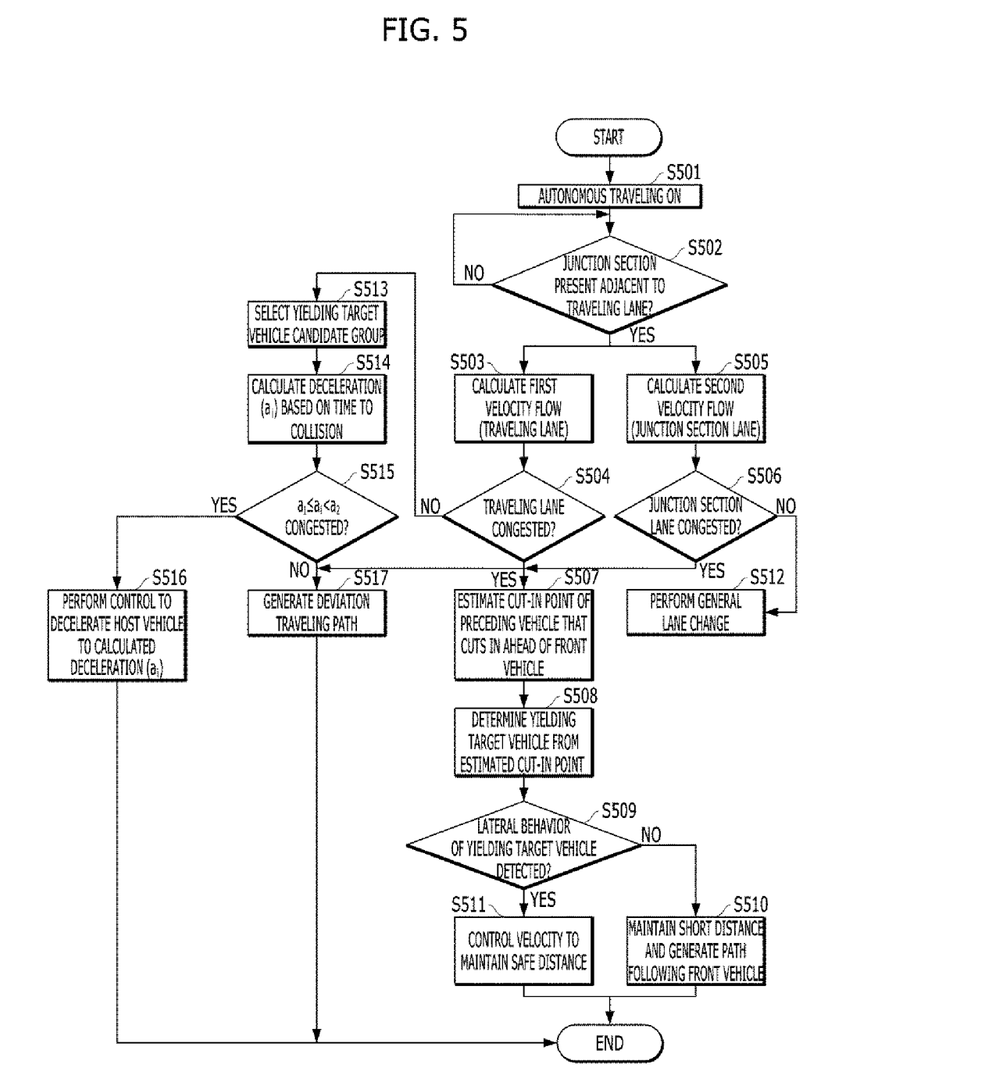
FIG. 5 is a flowchart illustrating a vehicle running control method.

FIG. 5 is a flowchart illustrating a vehicle running control method according to one form of the present disclosure.

As shown in FIG. 5, when autonomous traveling is performed (S501), the lane-change recognition unit 132 may determine whether a junction section is present adjacent to a traveling lane (for example, in the lane next to the traveling lane) based on the lane-based junction section information received from the map storage unit 110 (S502).

Upon determining that the lane next to the traveling lane is a junction section lane, the lane-change recognition unit 132 may determine whether the current traveling lane and/or the junction section lane are congested based on the vehicle information of adjacent vehicles, received from the sensor unit 120, and may determine the possibility of cut-in of junction section lane vehicles.

In order to determine whether the traveling lane and/or the junction section lane are congested, the lane-change recognition unit 132 may calculate a first velocity flow in the traveling lane and a second velocity flow in the junction section lane (S503 and S505), and may determine whether at least one of the calculated first velocity flow or the calculated second velocity flow is less than a critical value (S504 and S506).

In the case in which the calculated first velocity flow is less than the critical value (YES in S504), the lane-change recognition unit 132 may estimate a cut-in point of a vehicle that cuts in ahead of the vehicle in front of the host vehicle in order to determine the possibility of cut-in of the junction section lane vehicles (S507).

Step S507 may be performed according to a predetermined trigger signal generated when the second velocity flow calculated by the lane-change recognition unit 132 is less than the critical value (YES in S506).

After step S507, the lane-change recognition unit 132 may determine a vehicle corresponding to the estimated cut-in point to be a yielding target vehicle (S508). Here, the yielding target vehicle may be a vehicle adjacent to the estimated cut-in point, among vehicles behind a preceding vehicle.

The path generation unit 134 and/or the velocity controller 136 may control the sensor unit 120 in order to detect the lateral behavior of the yielding target vehicle (S509).

In the case in which no lateral behavior of the yielding target vehicle is detected (NO in S509), the path generation unit 134 may generate a path following the front vehicle while maintaining a predetermined first distance from the yielding target vehicle (S510).

In the case in which the lateral behavior of the yielding target vehicle is detected, the velocity controller 136 may generate a deceleration control signal in order to maintain a predetermined second distance from the yielding target vehicle, and the procedure may be finished (S511).

Meanwhile, in the case in which the first velocity flow in the traveling lane is equal to or greater than the predetermined critical value (NO in S504), the lane-change recognition unit 132 may select vehicles having a lower traveling velocity than the host vehicle, among the junction section lane vehicles, as a yielding target vehicle candidate group (S513).

The velocity controller 136 may receive information about at least one yielding target vehicle candidate group from the lane-change recognition unit 132, and may calculate a predetermined deceleration $a_i$ based on the time TTC (time to collision) to be taken for the host vehicle to collide with the at least one yielding target vehicle candidate group (S514).

The velocity controller 136 may determine whether the calculated deceleration $a_i$ is equal to or greater than a predetermined first value and less than a predetermined second value (S515). Upon determining that the deceleration $a_i$ is within the above range, the velocity controller 136 may perform control such that the velocity of the host vehicle is decreased to the calculated deceleration $a_i$ (S516).

Meanwhile, in the case in which the deceleration $a_i$ of the host vehicle, calculated by the velocity controller 136, is equal to or greater than the predetermined second value, the path generation unit 134 may control the traveling path of the host vehicle such that the host vehicle travels while deviating in the direction opposite the junction section lane (for example, toward the left side in the direction in which vehicles advance), and the procedure may be finished (S517).

The vehicle running control method according to the exemplary forms of the present disclosure described above may be implemented as a program that can be executed by a computer and stored in a computer-readable recording medium. Examples of the computer-readable recording medium include ROM, RAM, CD-ROM, magnetic tape, a floppy disk, and an optical data storage device.

The computer-readable recording medium may be distributed to a computer system connected over a network, and computer-readable code may be stored and executed thereon in a distributed manner. Functional programs, code, and code segments for implementing the method described above may be easily inferred by programmers in the art to which at least one form pertains.

Although only a few forms have been described above, various other forms may be provided. The above forms may be combined in various manners unless they are incompatible, and new forms may be realized therethrough.

As is apparent from the above description, according to at least one form of the present disclosure, it is possible to provide a vehicle running control apparatus that is capable of, when a traveling lane is congested, recognizing a preceding vehicle that cuts in ahead of a front vehicle, which is located in front of a host vehicle, in order to detect a yielding target vehicle in advance and maintaining a short distance from the yielding target vehicle in order to prevent the entry of other vehicles into the traveling lane, thereby securing stability in the relationship with other vehicles.

In addition, it is possible to provide a vehicle running control apparatus that is capable of, when traffic in a traveling lane is smooth, selecting at least one yielding target vehicle candidate group in advance and controlling a vehicle to decelerate such that the velocity thereof converges to the traveling velocity of the selected yielding target vehicle candidate group, thereby removing the discomfort of a user due to abrupt cut-in of other vehicles.

It will be appreciated by those skilled in the art that the effects achievable through the present disclosure are not limited to what have been particularly described hereinabove and that other effects of the present disclosure will be more clearly understood from the above detailed description.

It will be apparent to those skilled in the art that various modifications and variations can be made in the present disclosure without departing from the spirit or scope of the present disclosure. Consequently, the above detailed description is not to be construed as limiting the present disclosure in any aspect, and is to be considered by way of example. The scope of the present disclosure should be determined by reasonable interpretation of the accompanying claims, and all equivalent modifications made without departing from the scope of the present disclosure should be understood to be included in the scope of the following claims.

What is claimed is:

1. A vehicle running control method, comprising:
when a junction section lane is present adjacent to a traveling lane of a host vehicle, collecting, by one or more processors, vehicle information of at least one junction section lane vehicle among a plurality of junction section lane vehicles that are traveling in the junction section lane;
determining, by the one or more processors, a possibility of cut-in of the at least one junction section lane vehicle based on the collected vehicle information and whether the traveling lane is congested; and controlling, by the one or more processors, at least one of a traveling path or a traveling velocity of the host vehicle based on the determined possibility of cut-in, wherein whether the traveling lane is congested is determined by comparing a first velocity flow, which corresponds to an average velocity of a front vehicle traveling in the traveling lane, with a critical value, wherein determining the possibility of cut-in comprises:
estimating a cut-in point of a preceding vehicle that cuts in ahead of the front vehicle, among the plurality of junction section lane vehicles, when the first velocity flow is less than the critical value, and determining a vehicle adjacent to the estimated cut-in point, among junction section lane vehicles behind the preceding vehicle, as a yielding target vehicle, wherein controlling at least one of a traveling path or a traveling velocity of the host vehicle comprises:
detecting lateral behavior of the yielding target vehicle through a sensor;
generating a path following the front vehicle while maintaining a predetermined distance from the yielding target vehicle when no lateral behavior of the yielding target vehicle is detected; and
reducing the traveling velocity and maintaining a predetermined safe distance from the yielding target vehicle when the lateral behavior of the yielding target vehicle is detected, and wherein the vehicle running control method further comprises:
recognizing the preceding vehicle that cuts in ahead of the front vehicle, which is located in front of the host vehicle, in order to detect the yielding target vehicle before the preceding vehicle cuts in ahead of the front vehicle; and
maintaining a predetermined first distance from the yielding target vehicle in order to prevent the entry of other vehicles into the traveling lane.

2. The vehicle running control method according to claim 1, wherein collecting the vehicle information comprises collecting a position, a velocity, and an acceleration of each of the plurality of junction section lane vehicles through a sensor.

3. The vehicle running control method according to claim 1, wherein
determining the possibility of cut-in is performed based on a predetermined trigger signal, and
the predetermined trigger signal is generated when a second velocity flow, which is calculated by applying a predetermined weight to an average velocity of the plurality of junction section lane vehicles, is less than a critical value.

4. A non-transitory computer-readable recording medium containing a program recorded thereon, the program to direct one or more processors to perform acts of:
when a junction section lane is present adjacent to a traveling lane of a host vehicle, collecting vehicle information of at least one junction section lane vehicle among a plurality of junction section lane vehicles that are traveling in the junction section lane;
determining a possibility of cut-in of the at least one junction section lane vehicle based on the collected vehicle information and whether the traveling lane is congested; and
controlling at least one of a traveling path or a traveling velocity of the host vehicle based on the determined possibility of cut-in, wherein whether the traveling lane is congested is determined by comparing a first velocity flow, which corresponds to an average velocity of a front vehicle traveling in the traveling lane, with a critical value, wherein determining the possibility of cut-in comprises:
estimating a cut-in point of a preceding vehicle that cuts in ahead of the front vehicle, among the plurality of junction section lane vehicles, when the first velocity flow is less than the critical value, and
determining a vehicle adjacent to the estimated cut-in point, among junction section lane vehicles behind the preceding vehicle, as a yielding target vehicle, wherein controlling at least one of a traveling path or a traveling velocity of the host vehicle comprises:
detecting lateral behavior of the yielding target vehicle through a sensor;
generating a path following the front vehicle while maintaining a predetermined distance from the yielding target vehicle when no lateral behavior of the yielding target vehicle is detected; and
reducing the traveling velocity and maintaining a predetermined safe distance from the yielding target vehicle when the lateral behavior of the yielding target vehicle is detected, and wherein the program is further configured to direct one or more processors to perform acts of:
recognizing the preceding vehicle that cuts in ahead of the front vehicle, which is located in front of the host vehicle, in order to detect the yielding target vehicle before the preceding vehicle cuts in ahead of the front vehicle; and
maintaining a predetermined first distance from the yielding target vehicle in order to prevent the entry of other vehicles into the traveling lane.

5. A vehicle running control apparatus comprising:
a lane-change recognition unit configured to, when a junction section lane is present adjacent to a traveling lane of a host vehicle:
collect vehicle information of at least one junction section lane vehicle among a plurality of junction section lane vehicles that are traveling in the junction section lane, and
determine a possibility of cut-in of the at least one junction section lane vehicle based on the collected vehicle information and whether the traveling lane is congested;
a path generation unit configured to generate a traveling path of the host vehicle based on the determined cut-in possibility; and
a velocity controller configured to decelerate the host vehicle to a predetermined traveling velocity along the traveling path, wherein the lane-change recognition unit is configured to compare a first velocity flow, which corresponds to an average velocity of a front vehicle traveling in the traveling lane, with a critical value so as to determine whether the traveling lane is congested, wherein the lane-change recognition unit is configured to:
estimate a cut-in point of a preceding vehicle that cuts in ahead of the front vehicle, among the plurality of junction section lane vehicles, when the first velocity flow is less than the critical value, and
determine a vehicle adjacent to the estimated cut-in point, among junction section lane vehicles behind the preceding vehicle, as a yielding target vehicle in order to determine the possibility of cut-in, and wherein each of the path generation unit and the velocity controller is configured to detect lateral behavior of the yielding target vehicle through a sensor, wherein the path generation unit is configured to generate a path following the front vehicle while maintaining a predetermined distance from the yielding target vehicle when no lateral behavior of the yielding target vehicle is detected, wherein the velocity controller is configured to reduce the predetermined traveling velocity and maintain a predetermined safe distance from the yielding target vehicle when the lateral behavior of the yielding target vehicle is detected, and wherein the path generation unit is further configured to:
  recognize the preceding vehicle that cuts in ahead of the front vehicle, which is located in front of the host vehicle, in order to detect the yielding target vehicle before the preceding vehicle cuts in ahead of the front vehicle; and
  maintain a predetermined first distance from the yielding target vehicle in order to prevent the entry of other vehicles into the traveling lane.

6. The vehicle running control apparatus according to claim 5, wherein the vehicle information includes at least one of a position, a velocity, or an acceleration of the at least one junction section lane vehicle collected through a sensor.

7. The vehicle running control apparatus according to claim 5, wherein
  the possibility of cut-in is determined based on a predetermined trigger signal, and
  the predetermined trigger signal is generated when a second velocity flow, which is calculated by applying a predetermined weight to an average velocity of the plurality of junction section lane vehicles, is less than a critical value.

8. A vehicle running control apparatus, comprising one or more processors configured to:
  when a junction section lane is present adjacent to a traveling lane of a host vehicle, collect vehicle information of at least one junction section lane vehicle among a plurality of junction section lane vehicles that are traveling in the junction section lane;
  determine a possibility of cut-in of the at least one junction section lane vehicle based on the collected vehicle information and whether the traveling lane is congested;
  generate a traveling path of the host vehicle based on the determined cut-in possibility; and
  decelerate the host vehicle to a predetermined traveling velocity along the traveling path,
  wherein whether the traveling lane is congested is determined by comparing a first velocity flow, which corresponds to an average velocity of a front vehicle traveling in the traveling lane, with a critical value,
  wherein the one or more processors are further configured to determine the possibility of cut-in by:
    estimating a cut-in point of a preceding vehicle that cuts in ahead of the front vehicle, among the plurality of junction section lane vehicles, when the first velocity flow is less than the critical value, and
    determining a vehicle adjacent to the estimated cut-in point, among junction section lane vehicles behind the preceding vehicle, as a yielding target vehicle,
  wherein the one or more processors are further configured to:
    detecting lateral behavior of the yielding target vehicle through a sensor;
    generating a path following the front vehicle while maintaining a predetermined distance from the yielding target vehicle when no lateral behavior of the yielding target vehicle is detected; and
    reducing the traveling velocity and maintaining a predetermined safe distance from the yielding target vehicle when the lateral behavior of the yielding target vehicle is detected, and
  wherein the one or more processors are further configured to:
    recognize the preceding vehicle that cuts in ahead of the front vehicle, which is located in front of the host vehicle, in order to detect the yielding target vehicle before the preceding vehicle cuts in ahead of the front vehicle; and
    maintain a predetermined first distance from the yielding target vehicle in order to prevent the entry of other vehicles into the traveling lane.

* * * * *